US006527189B2

United States Patent
Fan

(10) Patent No.: US 6,527,189 B2
(45) Date of Patent: Mar. 4, 2003

(54) CARD READER CONNECTOR WITH REMOVABLE EXTENSION BRACKET

(75) Inventor: Chia-Hao Fan, Shu-Lin (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 14 days.

(21) Appl. No.: 09/749,012

(22) Filed: Dec. 26, 2000

(65) Prior Publication Data

US 2002/0060248 A1 May 23, 2002

(30) Foreign Application Priority Data

Nov. 23, 2000 (TW) ...................... 89220362 U

(51) Int. Cl.[7] .............. G06K 7/00; G06K 13/06
(52) U.S. Cl. ............... 235/486; 235/483; 235/485
(58) Field of Search ............ 235/479, 482–487, 235/495; 439/374, 377, 378

(56) References Cited

U.S. PATENT DOCUMENTS

| | | | | | |
|---|---|---|---|---|---|
| 3,932,016 A | * | 1/1976 | Ammenheuser | ............ | 439/377 |
| 4,932,889 A | * | 6/1990 | Bleier et al. | ................ | 235/482 |
| 5,055,970 A | * | 10/1991 | Weihs | ........................ | 235/486 |
| 5,315,478 A | * | 5/1994 | Cadwell et al. | ............. | 439/378 |
| 5,360,969 A | * | 11/1994 | Suzuki | ........................ | 235/475 |
| 5,483,422 A | * | 1/1996 | Bowen et al. | ............... | 235/486 |
| 6,033,253 A | * | 3/2000 | Yi et al. | ...................... | 439/377 |
| 6,056,579 A | * | 5/2000 | Richards et al. | ............. | 439/327 |
| 6,145,748 A | * | 11/2000 | Neifer et al. | ................ | 235/451 |

FOREIGN PATENT DOCUMENTS

JP  08185924 A  * 7/1996

* cited by examiner

Primary Examiner—Michael G. Lee
Assistant Examiner—Larry D Taylor
(74) Attorney, Agent, or Firm—Wei Te Chung

(57) ABSTRACT

A card reader connector includes a main body (10) and an extension bracket (50) removably attached to the main body. The main body includes an insulative housing (12) and metal contacts (22). A memory card (90) is inserted into slide grooves (24) of the housing, connected to the metal contacts, and supported by the housing. When the extension bracket is attached to the main body, it guides the card into the slide grooves and facilitates support of the inserted card. In one use, the main body without the extension bracket is mounted to a circuit board(72)of an electronic device (70). Part of an inserted card remains exposed outside of the device. In an alternative use, the main body 10 with the extension bracket attached thereto is mounted to a circuit board (82) of an electronic device (80). An inserted card is thus hidden within the device.

5 Claims, 6 Drawing Sheets

CARD READER CONNECTOR WITH REMOVABLE EXTENSION BRACKET

BACKGROUND OF THE INVENTION

1. Field of the Invention

The present invention relates to a card reader connector, and particularly to a card reader connector with a changeable configuration which enables a card to be inserted therein such that the card remains exposed or is hidden within an electronic device.

2. Description of the Related Art

Portable electronic devices, such as cellular telephones, wireless communication devices and portable computers, are becoming smaller and smaller. At the same time their functions are increasing more and more. One way of expanding functions is to configure electronic devices with memory cards containing integrated circuit chips. For example, a subscriber identity module (SIM) card is placed in a portable phone to make the phone dedicated to the SIM card owner. By changing SIM cards, a single phone can be used by many individual SIM card owners as a personal phone. A multi-media card (MMC) built into a telephone can store an entire telephone book of phone numbers, voice, and mail messages, and so on. Such card can also provide other memory intensive functions.

A memory card is usually mechanically and electrically secured in an electronic device by a card reader connector. There are two types of conventional card reader connectors. The first type is integrative, which installs part of the card beneath a cover of the electronic device. The card is exposed outside of the device, and can be inserted into or withdrawn from the device directly. However, the card reader connector can only enable the card to be exposed. The connector cannot be used to hide the card completely within the electronic device. Furthermore, the connector can only be used with certain special electronic devices. Thus, the connector has limited commercial application. Manufacturing of other connectors which are necessary for other applications increases costs.

The second type of convention card reader connector hides the card completely within the electronic device, as disclosed in U.S. Pat. Nos. 5,603,629, 5,813,878, and 5,933,328. The connector includes a housing, metal contacts received in the housing, and a card carrier pivotally attached to the housing. The card carrier can move between an open position with respect to the housing for inserting the card therein, and a closed position for urging the card against the contacts to thereby make electrical connection with the device. Another similar second type of conventional card reader connector is disclosed in U.S. Pat. Nos. 5,822,183 and 5,831,256. The card is installed in a recess of a housing of the electronic device. Then a plate is pressed on the card to secure the card and make the card electrically contact the device. For all these second types of conventional card reader connector, taking out the card requires opening a cover of the electronic device and then lifting the card carrier or taking off the pressing plate. This is unduly inconvenient and troublesome.

SUMMARY OF THE INVENTION

Accordingly, an object of the present invention is to provide a card reader connector which can house a card not only such that the card remains exposed, but also such that the card is hidden within an electronic device.

Another object of the present invention is to provide a card reader connector which can be used with electronic devices of multifarious configurations.

A further object of the present invention is to provide a card reader connector which allows convenient insertion and removal of a card.

A card reader connector in accordance with the present invention includes a main body and an extension bracket removably attached to the main body. The main body includes an insulative housing and metal contacts. The housing has a chassis, two opposite side walls and a front wall, thereby leaving a rear side open. A memory card is insertable along slide grooves into the main body, whereupon the card is supported by the housing. When the extension bracket is attached to the main body, it guides a card into the slide grooves of the main body and facilitates support of the inserted card. In one use, the main body without the extension bracket is mounted to a circuit board of an electronic device adjacent an opening of the device. Part of an inserted card remains exposed outside of the device. In an alternative use, the main body and the extension bracket are connected together to function as a single card reader connector. The connector is mounted to a circuit board of an electronic device, in an area relatively far from an opening of the device. An inserted card is thus hidden within the device. Depending on the configuration of a user's circuit board and the user's own personal preferences, the user can choose either of the above uses.

Other objects, advantages and novel features of the invention will become more apparent from the following detailed description of a preferred embodiment thereof when taken in conjunction with the accompanying drawings, wherein:

DETAILED DESCRIPTION OF THE PREFERRED EMBODIMENT

Figure 1:
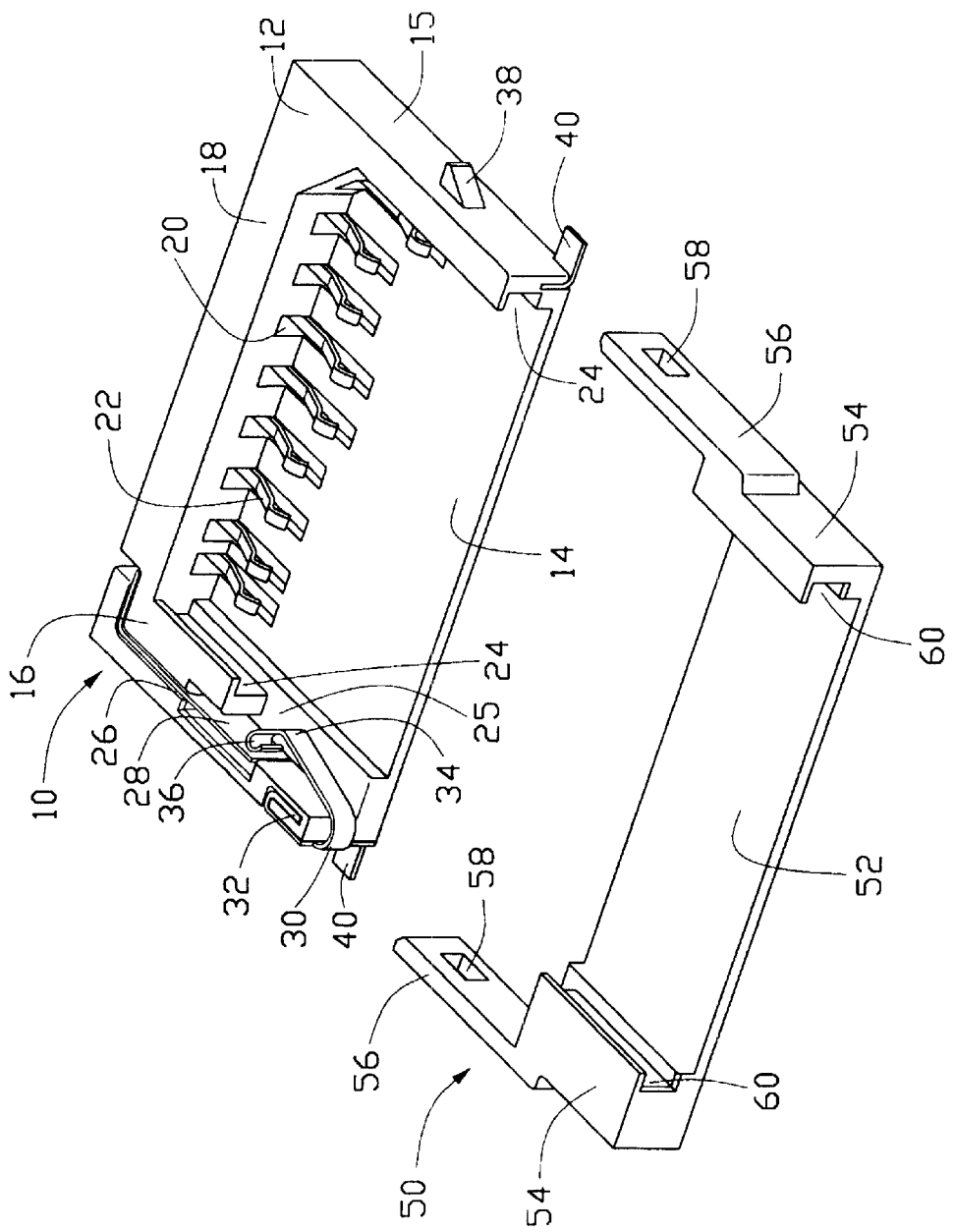
FIG. 1 is an exploded view of a card reader connector in accordance with the present invention.
Figure 2:
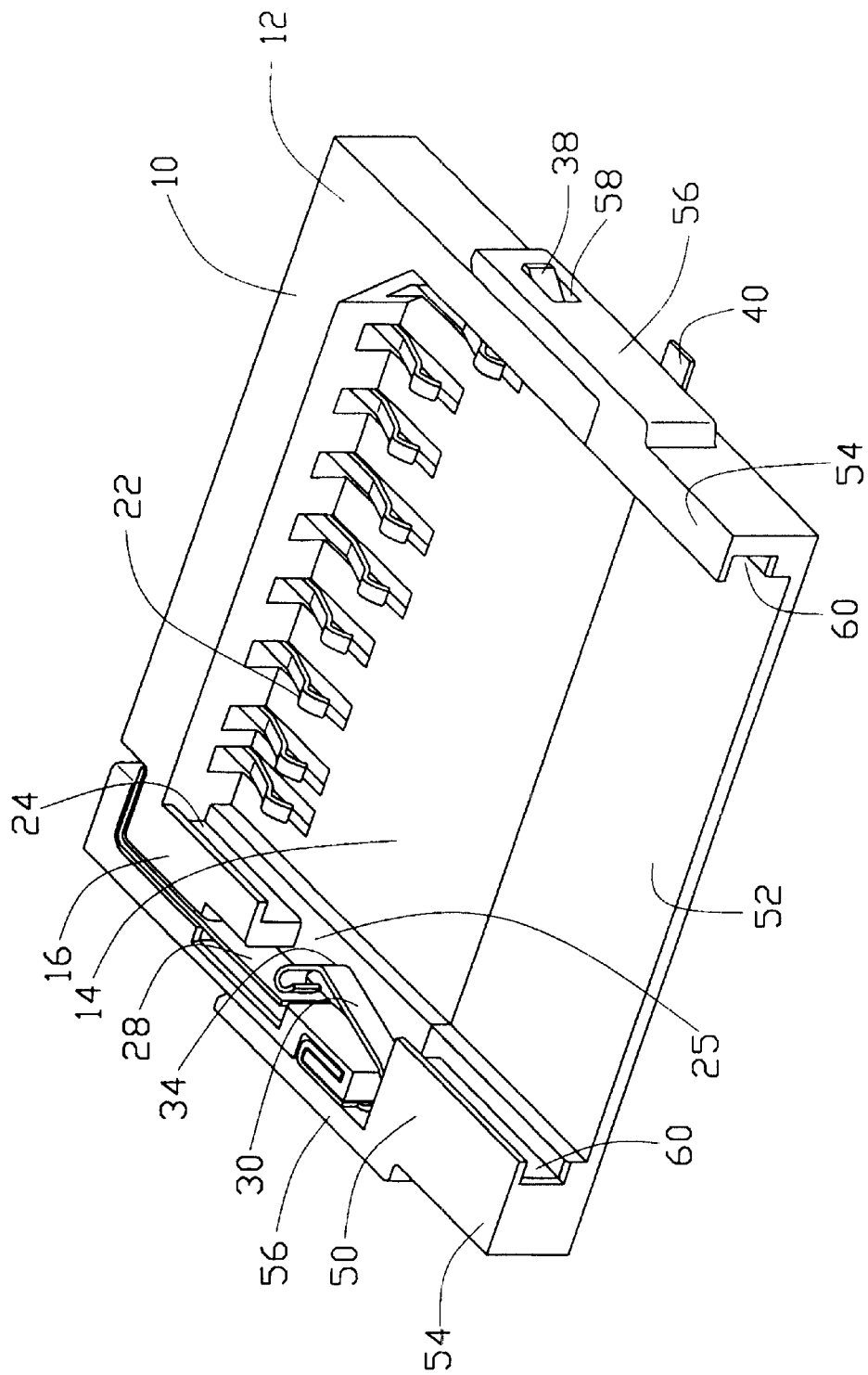
FIG. 2 is an assembled view of FIG. 1.

Referring to FIGS. 1 and 2, a card reader connector in accordance with the present invention includes a main body 10 and an extension bracket 50 removably attached to the main body 10.

The main body 10 includes an insulative housing 12 and a plurality of metal contacts 22. The housing 12 has a chassis 14, two opposite first and second side walls 15, 16 and a front wall 18, thus leaving a rear side of the housing open. A cavity 25 is defined in a rear portion of the second side wall 16, in communication with a rear opening of the housing 12. A plurality of passages 20 is defined in the chassis 14 and the front wall 18, for receiving the contacts 22. A pair of slide grooves 24 is respectively defined in inner surfaces of the first and second side walls 15, 16. An L-shaped slot 26 is defined in a top surface of the second side wall 16. The L-shaped slot 26 has a wider end in communication with the cavity 25. A conductive L-shaped panel 28 is accommodated in the L-shaped groove 26. A front end of the L-shaped panel 28 is interferentially engaged with the second side wall 16 at a narrower end of the L-shaped groove 26, and a rear end of the L-shaped panel 28 is free at the wider end of the L-shaped groove 26. A recess 32 is defined in an outer surface of the second side wall 16, for engaging with a metal spring leaf 30. The metal spring leaf 30 extends from the recess 32 around a rear end of the side wall 16 to the cavity 25. A free end of the spring leaf 30 is disposed in the cavity 25. The free end of the spring leaf 30 has a first contact portion 34 protruding inwardly, and a second contact portion 36 contacting the free end of the L-shaped panel 28. Two fillets 40 are respectively mounted to the first and second side walls 15, 16, and respectively extend perpendicularly outwardly therefrom. A pair of lugs 38 is respectively formed on outer surfaces of the first and second side walls 15, 16.

The extension bracket 50 is a frame comprising a base 52 and two side panels 54. Each side panel 54 defines a guiding groove 60 in an inner surface thereof. A pair of cantilevers 56 respectively extends from front ends of the side panels 54. A hole 58 is defined in each cantilever 56. As shown in FIG. 2, the extension bracket 50 can be connected to the main body 10 to form a single unit. To connect the extension bracket 50 to the main body 10, the holes 58 of the cantilevers 56 engagingly receive the lugs 38 of the main body 10. The slide grooves 24 of the main body 10 and the guiding grooves 60 of the extension bracket 50 are thereby aligned.

Figure 3:
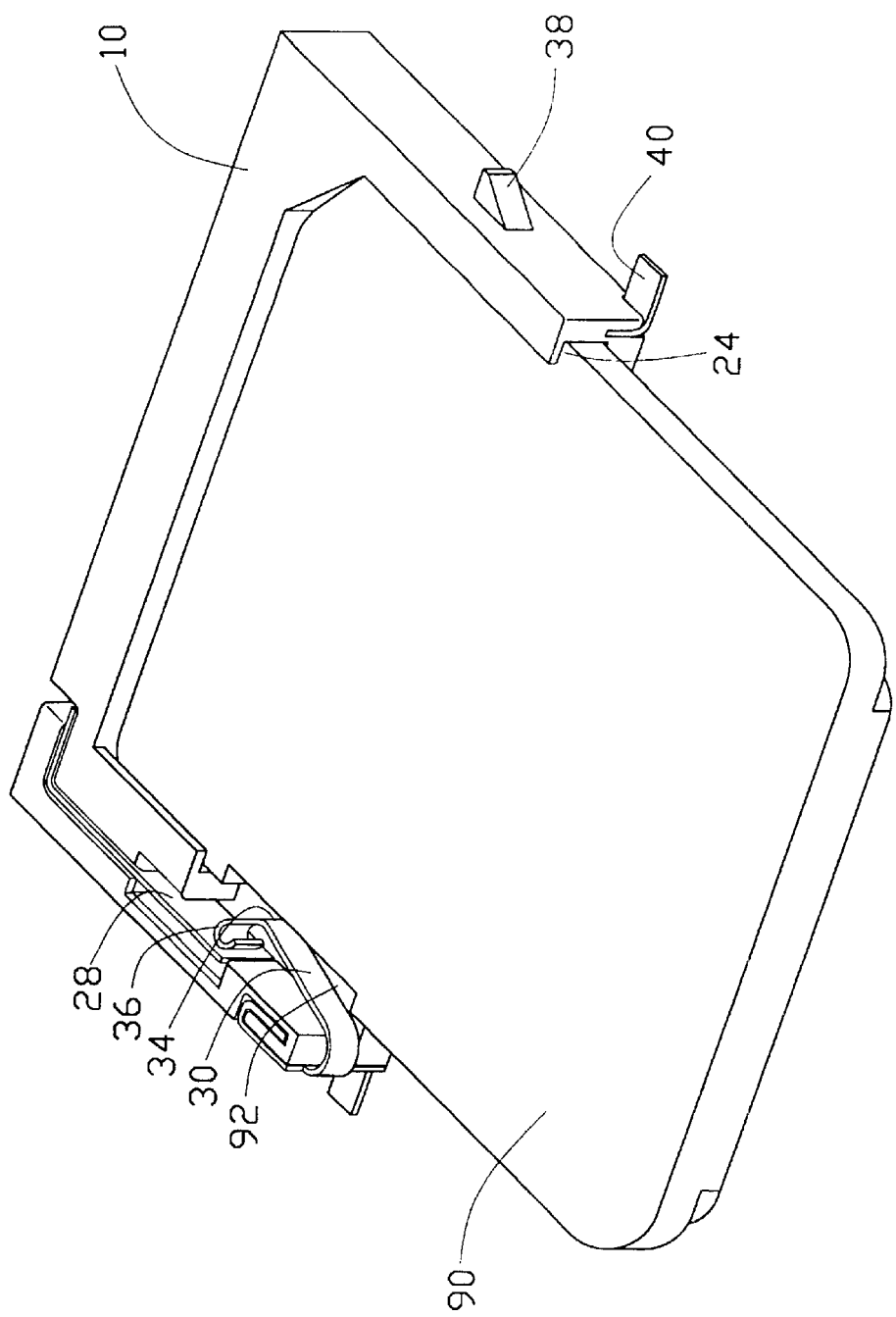
FIG. 3 is a perspective view of a main body of the connector of FIG. 1, with a memory card inserted into the main body.
Figure 4:
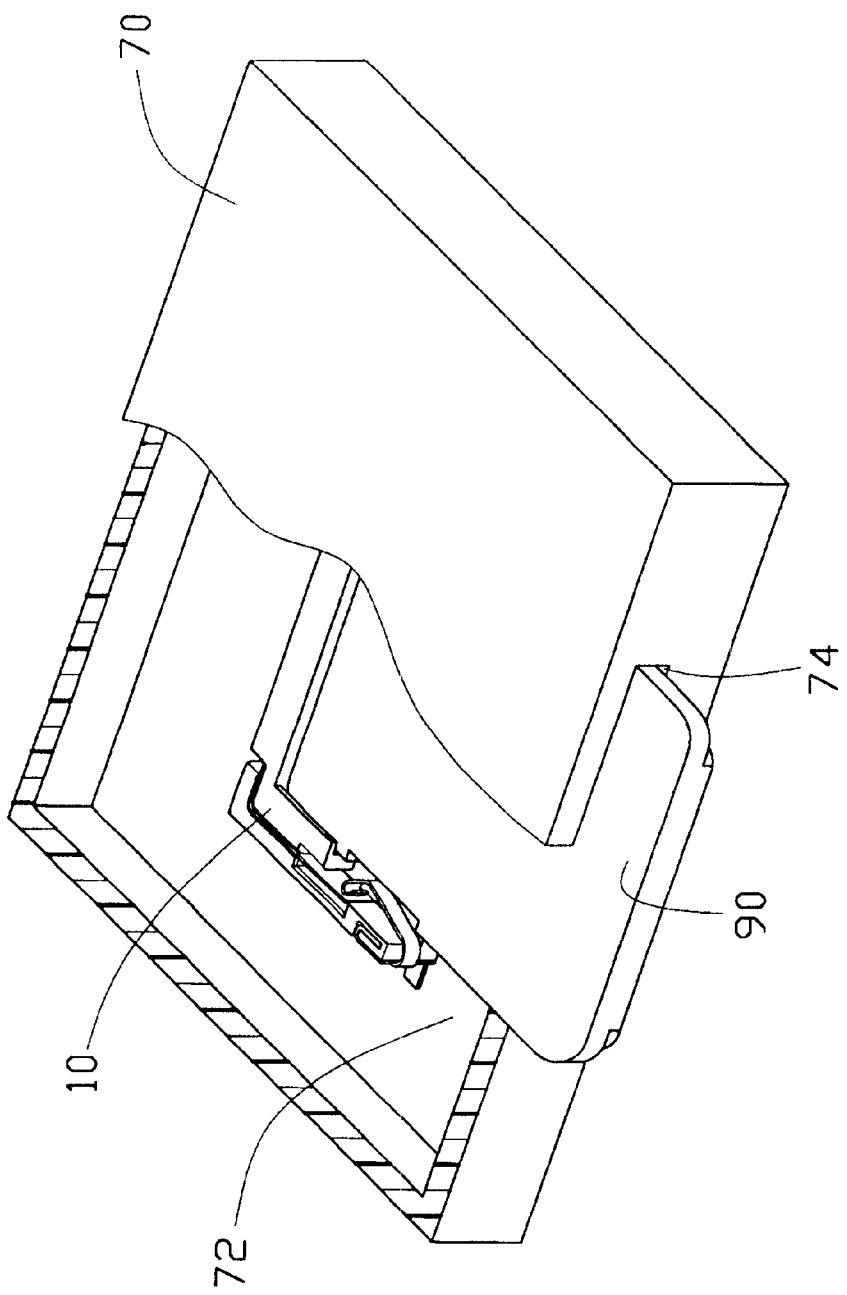
FIG. 4 is a partly cut-away view of the main body mounted to an electronic device, with a memory card inserted into the main body.

In FIGS. 3 and 4, the main body 10 functions as an independent card reader connector without the extension bracket 50. The fillets 40 of the main body 10 are soldered and electrically connected to a first circuit board 72 of a first electronic device 70. As shown in FIG. 4, the main body 10 is installed adjacent an opening 74 of the electronic device 70, to allow convenient insertion of a memory card 90. The card 90 is inserted through the first opening 74 of the electronic device 70. The card 90 is slid into the main body 10 along the slide grooves 24 thereof until metal fingers (not shown) of the card 90 contact the metal contacts 22 of the main body 10. The first contact portion 34 of the metal spring leaf 30 resiliently contacts the card 90 at a gap 92 defined in a side of the card 90. Thus the card 90 is securely mounted in the electronic device 70. A part of the card 90 remains exposed outside of the electronic device 70.

Figure 5:
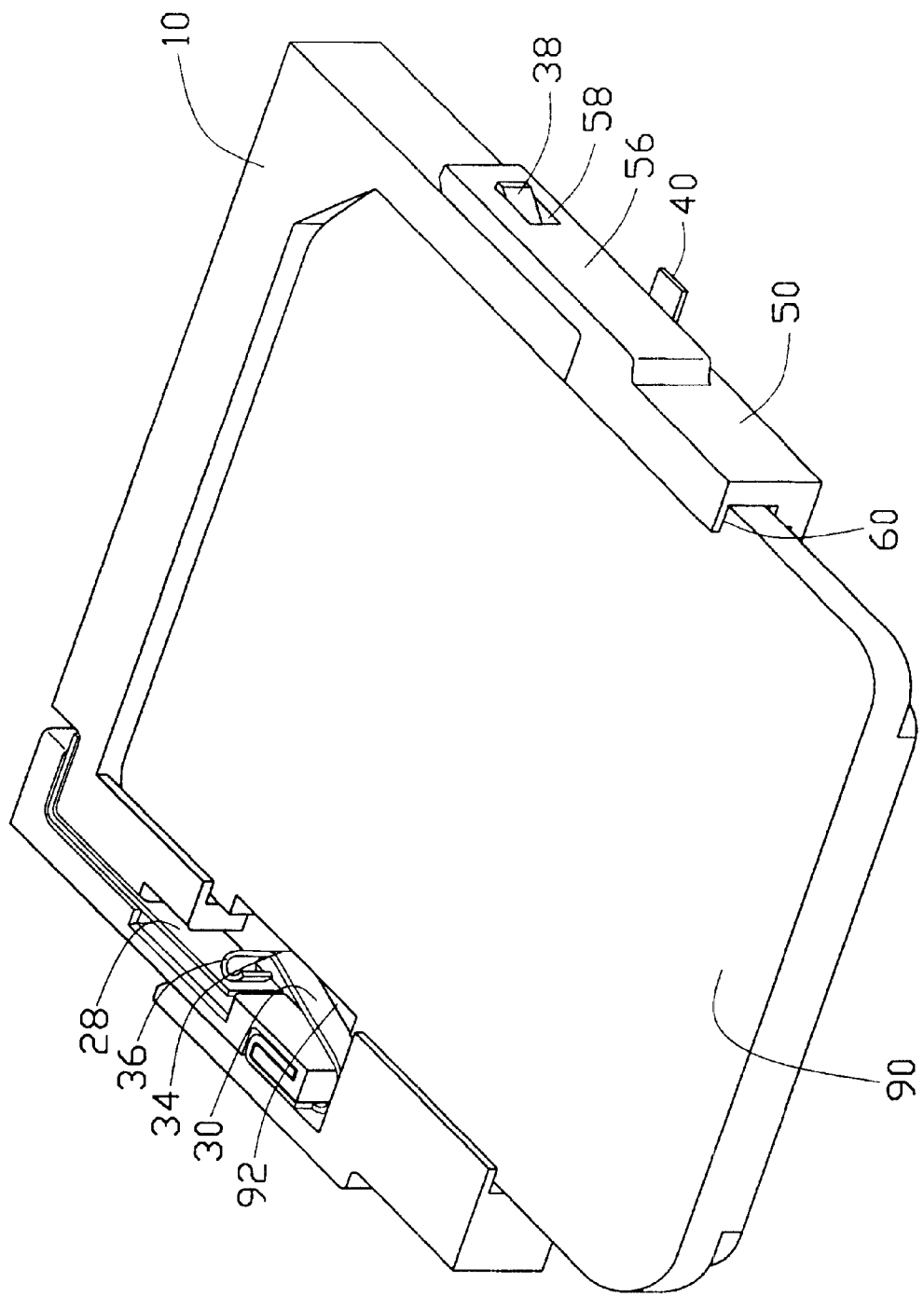
FIG. 5 is a perspective view of the connector of FIG. 1, with a memory card inserted therein.
Figure 6:
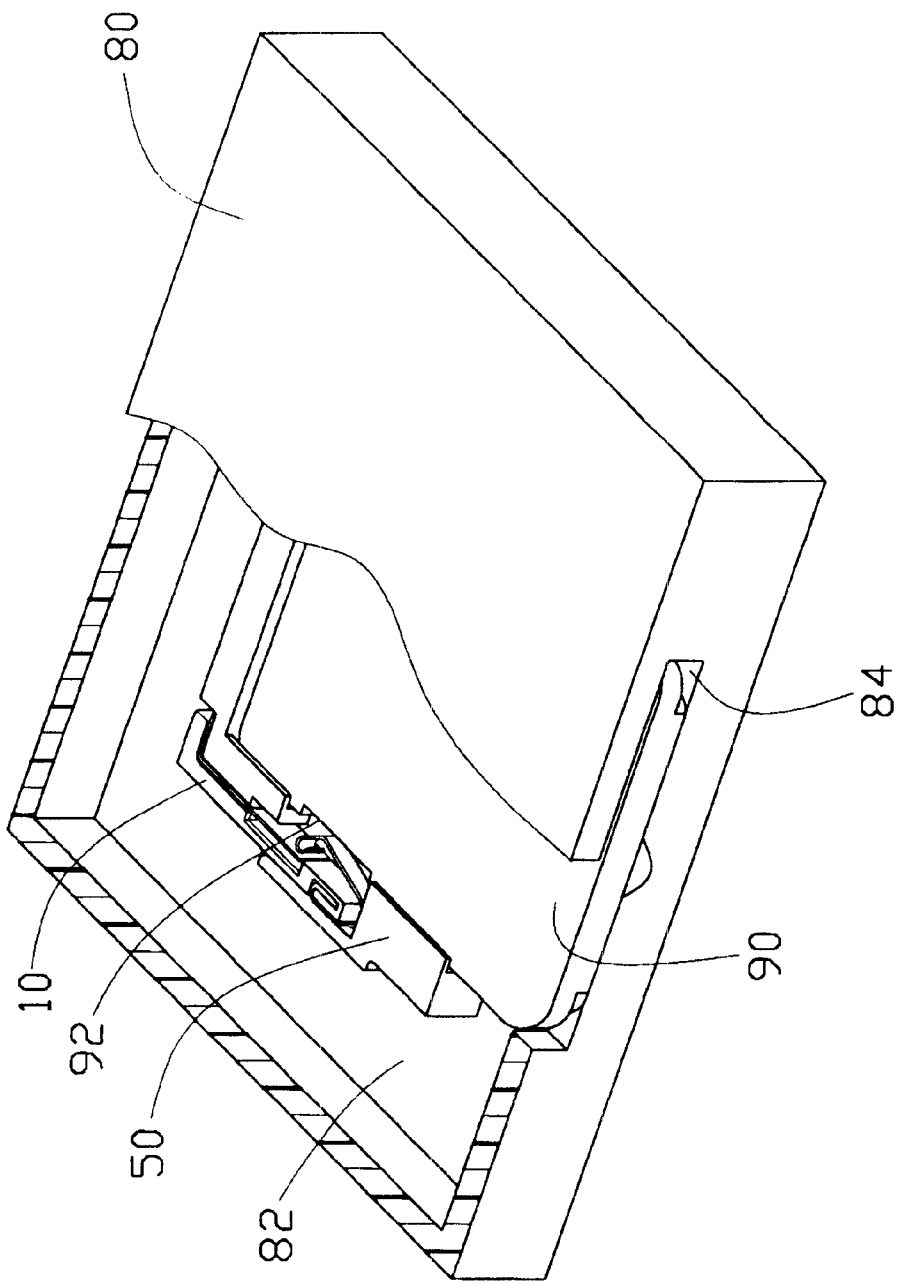
FIG. 6 is a partly cut-away view of the connector of FIG. 1 mounted to an electronic device, with a memory card inserted into the connector.

In FIGS. 5 and 6, the main body 10 and the extension bracket 50 are connected together to function as a single card reader connector. The fillets 40 of the main body 10 are soldered and electrically connected to a second circuit board 82 of a second electronic device 80. The single card reader connector is installed in an area further away from a second opening 84 of the electronic device 80, because the connector is relatively large. A memory card 90 is mounted to the connector in much the same way as described in the above paragraph. The card 90 is guided by the guiding grooves 60 of the extension bracket 50 into the slide grooves 24 of the main body 10. When the card 90 has been completely mounted, it is hidden within the electronic device 80. The extension bracket 50 facilitates support of the inserted card 90.

It is understood that the invention may be embodied in other forms without departing from the spirit thereof. Thus, the present examples and embodiment are to be considered in all respects as illustrative and not restrictive, and the invention is not to be limited to the details given herein.

I claim:

1. A card reader connector comprising:

a main body adapted to receive a memory card, the main body having an insulative housing and a plurality of metal contacts received in the housing, the insulative housing being open at a rear side and comprising a chassis, two opposite side walls and a front wall;

an extension bracket removably attached to the main body and adapted to guide a memory card into the main body and to facilitate support of the received memory card; wherein a metal spring leaf is secured to a side wall of the housing and a conductive L-shaped panel is provided which has an end engaged with the side wall of the housing and another end contacting a free end of the metal spring leaf.

2. The card reader connector as described in claim 1, wherein the housing of the main body forms at least one lug, and the extension bracket defines at least one hole for latching with the corresponding lug.

3. The card reader connector as described in claim 1, wherein the extension bracket comprises a base and two side panels, each side panel having a cantilever.

4. The card reader connector as described in claim 1, wherein the metal spring leaf is curviform.

5. The card reader connector as described in claim 4, wherein the metal spring leaf has one end attached to the side wall and another free end protruding inwardly from the side wall.

* * * * *